Sept. 15, 1970   J. P. O'HARA ET AL   3,528,775
METHOD AND APPARATUS FOR TESTING PETROLEUM
PRODUCTS FOR WATER CONTENT
Filed Jan. 25, 1967

Inventors
John P. O'Hara
Robert K. Siegfriedt

By
                Agent

United States Patent Office 3,528,775
Patented Sept. 15, 1970

3,528,775
METHOD AND APPARATUS FOR TESTING PETROLEUM PRODUCTS FOR WATER CONTENT
John P. O'Hara, Staten Island, and Robert K. Siegfriedt, Merrick, N.Y., assignors to Mobil Oil Corporation, a corporation of New York
Filed Jan. 25, 1967, Ser. No. 611,738
Int. Cl. G01n 31/16, 33/18
U.S. Cl. 23—230                                   1 Claim

ABSTRACT OF THE DISCLOSURE

Transformer oil is analyzed for moisture content by extracting with anhydrous methanol and visually titrating the methanol extract with Karl Fischer reagent. The extraction and titration are carried out in a septum-stoppered bottle using syringes to transfer the oil sample and reagents.

FIELD OF THE INVENTION

Figure 1:
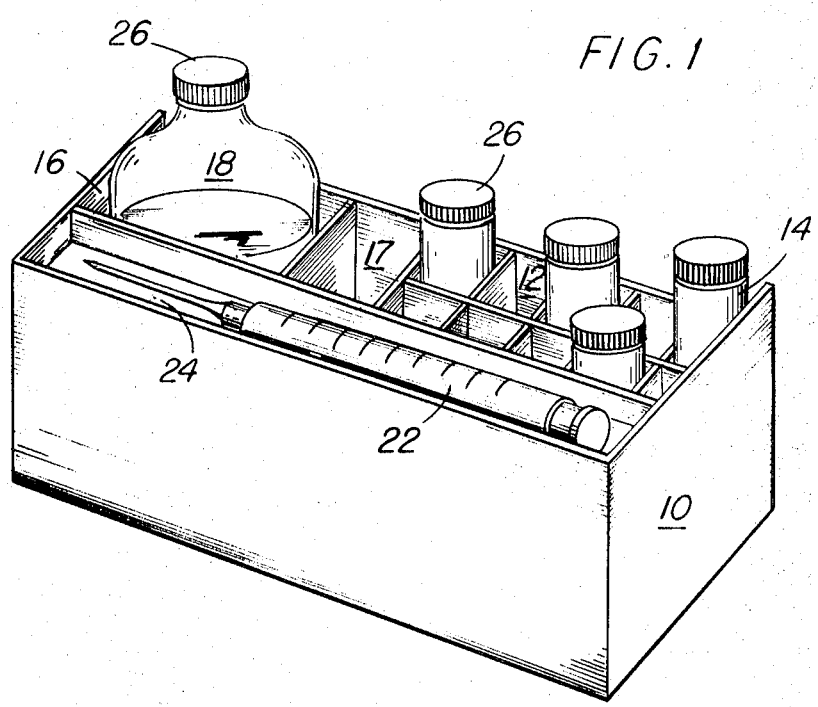

This invention relates to the quantitative determination of small amounts of water present in water-immiscible petroleum products and, more particularly, to a convenient method and apparatus for testing hydrocarbon mixtures such as transformer oil in the field to determine trace amounts of water which may be present therein.

DESCRIPTION OF THE PRIOR ART

The quantitative determination of the amount of water present in petroleum products is of considerable industrial importance. For instance, in the maintenance of Diesel engines, such as those used on railroad locomotives, it is generally recognized that the water content of the lubricating oil should be kept below about 0.45% to 0.5% by weight to minimize damage to the moving parts of the engine. Trace quantities of dispersed water in aviation fuels can have serious consequence as such water may accumulate in the float bowl of the carburetor and result in engine failure particularly at high altitudes and low temperatures where carburetor icing may occur. Water that is present in aviation jet fuels freezes to form ice crystals at the low temperatures encountered in high altitude operations. Such ice crystals may block the fuel lines and fuel jets. Transformer oil is another petroleum product, the performance of which is adversely effected by the presence of trace amounts of moisture.

Many methods have been developed for the quantitative determination of water, but such procedures, in general, must be carried out in well equipped laboratories, using sophisticated equipment. If one requires immediate, on the spot, information with respect to the water content of a particular petroleum product, there is not sufficient time to transmit samples to a distant laboratory and wait for a report from a chemical analyst.

SUMMARY OF THE INVENTION

In accordance with the present invention as more fully hereinafter described, there is provided a simple, accurate and rapid test for determining the quantity of water in petroleum products. The test method to be described has particular application to the determination of moisture in transformer oils.

Broadly, the invention comprises collecting a relatively small sample of the transformer oil to be tested and extracting it with methanol in a sealed container. The methanol acts as a solvent for the water present in the oil, and will form a separate liquid phase on standing as methanol and oil are not miscible. The methanol phase is titarated to a visual end point with Karl Fischer reagent to determine the amount of water therein. This method has been adapted for field use by providing septum-stoppered bottles and vials to contain all liquids and using hypodermic syringes to make all transfers.

DESCRIPTION OF SPECIFIC EMBODIMENTS

Karl Fischer reagent (referred to hereinafter as "KF" reagent) consists of iodine, sulfur dioxide, pyridine and methanol. In the presence of water, iodine oxidizes sulfur dioxide by the reversible reaction:

$$I_2 + SO_2 + H_2O \rightleftharpoons 2HI + SO_3$$

When carried out in the presence of pyridine, this reaction goes to completion with the formation of pyridine salts:

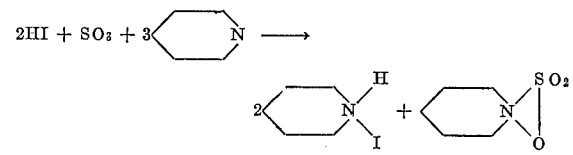

Methanol, in addition to acting as a solvent, reacts with the pyridine-sulfur trioxide, preventing its combination with any unreacted water:

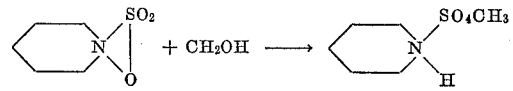

When a solution containing water is titrated with the reagent, the color fades to colorless or yellow until all the water is consumed. At the end point, an amber color resulting from unreacted free iodine persists. A 0.01 N potassium dichromate solution may be used as a color standard to match the color at the end point.

The "KF" reagent may be made up to contain the components in the ratio: 1 mole $I_2$:3 moles $SO_2$:10 moles $C_5H_5N$ and diluted with methanol so that 1 ml. of the reagent reacts with 1.5 mg. to 0.8 mg. of water. Alternatively, the prepared reagent is available commercially in the form of two solutions; one solution contains iodine, sulfur dioxide and pyridine; the other contains pyridine in ethyl alcohol. The two solutions can be mixed as needed to produce the concentrated reagent, which may be further diluted with methanol to give a reagent equivalent to about 1 mg. of water per milliliter.

The methanol employed in this test is anhydrous and should contain less than 0.05% water.

Figure 2:
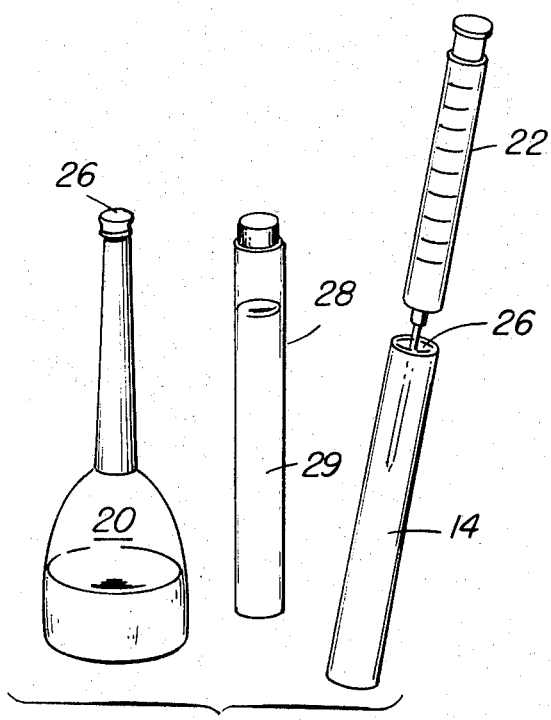

In the accompanying drawings, a portable testing kit particularly satisfactory for use in the field is shown. FIG. 1 represents a perspective view of a carrying case with receptacles for reagent bottles, sealed vials, and hypodermic syringes disposed therein. FIG. 2 shows a reagent bottle, sealed vial, hypodermic syringe and color standard removed from the case.

The case 10 is constructed with a plurality of compartment 12 for retaining the empty vials 14, and at least two larger compartments 16 and 17 for the "KF" reagent 18 and anhydrous methanol 20, respectively. At least three hypodermic syringes 22, in sizes of 20, 10 and 1 milliliters and fitted with sizes 14, 19 and 25 hypodermic needles, are stacked one above the other in the slot 24.

Each vial and the reagent bottles 18 and 20 are sealed from the atmosphere with a puncture-type flexible seal 26 which may be molded of rubber or like elastomer. A clear glass tube 28 containing a 0.01 N potassium dichromate solution 29 is also provided with the kit as a color standard.

The following are typical examples of the method of the present invention as used to determine the moisture content of transformer oils, and such examples illustrate the use of the portable testing kit in the field.

EXAMPLE I

Standardization of "KF" reagent

The proper adjustment of the strength of the "KF" reagent and the standardization of this reagent is most conveniently done in the laboratory. It has been found that the reagent shows a marked decrease in strength within the first 2–3 days, followed by a more gradual decrease with time. The freshly prepared solution, therefore, should be allowed to stand at least 24 hours before being standardized, and should be standardized periodically (at least once each day it is used).

One milliliter of methanol is added to a flask fitted with a burette, a stopcock pipette, and magnetic stirrer, and is sealed from the atmosphere. The methanol is titrated with "KF" reagent, while stirring. A light yellow color appears and increases in intensity. At the end point, there is a sudden change to amber. At this point, water in the methanol and in the air in the flask have been consumed. The volume of reagent necessary to obtain this initial end point is disregarded. Exactly 1 ml. of methanol is drained into the sealed flask from the stopcock pipette, and is titrated to a new end point. The amount of "KF" reagent used in this titration is recorded. This determination on successive 1 ml. additions of methanol is repeated until checks within 0.02 ml. are obtained. The average of these check values is used as a measure of the water content of the methanol.

A standard solution of water in another portion of the same methanol is prepared by pipetting or weighing 10 mg. of water into a dry 10 ml. volumetric flask and making up to volume with the methanol. One milliliter of this solution is titrated in exactly the same manner as before, and this determination is repeated until checks within at least 0.02 ml. are obtained. The average of these check values, S, may be used to calculate the water equivalence of the "KF" reagent by the formula:

$$E = \frac{W}{(S-B)V}$$

where:

E = equivalence in milligrams of water per milliliter of "KF" reagent;
B = milliliters of "KF" reagent used to titrate one milliliter of methanol;
S = milliliters of "KF" reagent used to titrate one milliliter of the standard water in methanol solution;
W = milligrams of water added to the volumetric flask for the standard solution;
V = volume of the volumetric flask in milliliters.

The strength of the "KF" reagent should preferably be between about 1.5 mg. and 0.8 mg. of water per milliliter. If the water equivalence of the "KF" reagent is less than about 0.8 mg. of water per milliliter, it becomes difficult for the analyst to evaluate the more gradual approach to the color at the end point. If the water equivalence of the "KF" reagent is greater than about 1.5 mg. per milliliter, the significance of the number of milliliters of "KF" reagent used in the equation is decreased.

The standard solution of water in methanol (containing about 1 milligram of water per milliliter) can be sealed in a bottle with a puncture type rubber stopper and included as a reagent in the portable test kit, if one wishes to have a means for checking the water equivalence of the "KF" reagent in the field.

EXAMPLE II

Use of portable kit to analyze transformer oil for moisture contact

A ten milliliter syringe 22 fitted with a number 19 needle is used to withdraw ten milliliters of anhydrous methanol from the supply bottle 20 and inject it through the rubber stopper 26 into a forty milliliter vial 14. A one milliliter syringe fitted with a No. 25 needle is used to withdraw the "KF" reagent from the supply bottle and add it to the methanol in the reaction vial 14. This consumes trace amounts of water present in the methanol as well as moisture present in the air vapor within the vial. Small additions (0.05 ml.) of "KF" reagent are made and the vial is shaken for 10 seconds after each addition and compared with the color standard 29 supplied with the kit.

When the organe color of the solution within the vial 14 matches that of the color standard 29, a twenty milliliter syringe fitted with a No. 15 needle is filled with a sample of transformer oil to be tested and is injected through the rubber seal 26 into the water-free environment within the vial. The methanol and transformer oil are mixed by shaking the vial for 15 seconds. Methanol and transformer oil are immiscible and on standing will separate into two liquid phases. Any moisture present in the transformer oil is dissolved in the methanol layer which separates on top.

The one milliliter syringe is filled with "KF" reagent and is added through the flexible rubber seal 26 in 0.05 ml. increments. After each addition, the vial is shaken for 10 seconds and is premitted to stand until two liquid phases separate. The upper methanol layer is compared with the color standard to note when the end point is reached. This comparison can be made visually. It will be understood, however, that a suitable color comparator can also be used.

The water content of the sample in parts per million by weight is calculated using the equation:

$$\text{Water} = \frac{1000EA}{VD}$$

where:

E = water equivalence of "KF" reagent in milligrams per milliliter,
A = milliliters of "KF" reagent to titrate sample,
V = volume of sample taken in milliliters;
D = density of sample in grams per milliliter (an average density for the product tested can be used).

EXAMPLE III

Accuracy of field determinations

As a quantitative illustration of the accuracy of the field determinations by the method described in Example II above, samples were taken of a barge delivery following transport of a transformer oil for distance of 200 miles. The moisture content was determined at the receiving port, with a portable field kit by the method described in Example II. Similar determinations were made in the laboratory at the despatch port using a "KF" reagent mico-burette assembly, an automatic all-glass burette in which the reagent is stored. Provision is made to exclude moisture from the reagent by a $P_2O_5$ drying tube when the apparatus is in use, and by a stopcock when the apparatus is not in use. A side-arm flask is provided to fit the standard taper joint at the burette tip, and a Van Slyke stopcock pipette with a standard taper joint to fit the side-arm of the flask is used to introduce the sample through the side-arm into the flask without opening the flask to the air. A motor driven magnet is used to rotate a small glass stirrer inside the flask. The stirrer is made by sealing some iron wire or filings inside a glass tube which is only slightly shorter than the inside diameter of the bottom of the flask.

The following table of data is indicative of the end point being observed correctly and the test being a true measure of the moisture content.

| Barge compartment | Moisture content at despatch port (p.p.m.) | Moisture content, field kit a, receiving port (p.p.m.) |
|---|---|---|
| Port 1 | 26 | 22 |
| Starboard 1 | 35 | 28 |
| Port 2 | 26 | 27 |
| Starboard 2 | 23 | 24 |
| Port 4 | 27 | 26 |
| Port 5 | 28 | 28 |
| Starboard 5 | 28 | 26 |
| Port 6 | 32 | 28 |
| Starboard 6 | 30 | 23 |

The method of the present invention may be used to analyze for water content, petroleum products that contain no additives or organic compounds which react with the "KF" reagent. Compounds which do interfere with the method of the present invention generally react stoichiometrically, so that appropriate corrections can be applied if the amount of interfering substance can be determined by other methods. Mercaptan sulfur, for example, should be corrected for if present in amounts greater than 20 p.p.m. This may be done by multiplying the mercaptan sulfur content in parts per million by the factor 0.3, and subtracting the resultant value from the water content found.

While a preferred embodiment of the method and apparatus of the present invention have been described for the purpose of illustration, it should be understood that various modifications and adaptations thereof, which will be obvious to those skilled in the art, may be made without departing from the spirit of the invention. For example, each of the vials 14 that are present in the kit may contain 10 ml. of anhydrous methanol and the air space above the methanol in each vial may be filled with dry nitrogen to obviate the need of adding methanol to the oil sample in the field.

What is claimed is:
1. The method for determining the water content of a water-immiscible petroleum product, using a combination of hypodermic syringe with vials closed by a puncture-type flexible seal wherein a moisture free atmosphere is maintained by effecting transfer of reagents from sealed vials to a so-sealed test vial while maintaining the integrity of the seals by accomplishing such transfers by means of a calibrated hypodermic syringe, said method comprising

(a) injecting with a hypodermic syringe a measured quantity of methanol through the flexible seal into the test vial, (b) injecting with a hypodmeric syringe through the flexible seal into the test vial the minimum quantity of Karl Fischer reagent sufficient to react with trace amounts of moisture present in the methanol and the atmosphere within the sealed test vial, (c) injecting with a hypodermic syringe into the sealed test vial thus dried an aliquot sample of the petroleum product to be tested for moisture content, (d) agitating the vial until the moisture in the petroleum product is extracted by the methanol, (e) permitting the agitated contents of the sealed vial to separate by standing to provide a methanol phase, and (f) dehydrating the methanol phase to a visual end point by injecting with a hypodermic syringe small measured increments of Karl Fischer reagent through the flexible seal into the test vial.

References Cited

Jordan, C. B.: Analytical Chemistry, vol. 36, pp. 424–5 (1964).

Menville, R. L. et al.: Analytical Chemistry, vol. 25, pp. 840–1 (1953).

Ponting, J. D. et al.: Chemist-Analyst, vol. 54(4) p. 123 (1965).

Mitchell, J. et al.: Aquametry, p. 68 (1948).

Welcher, F. J.: Standard Methods of Chemical Analysis, vol. 2, part A, pp. 526–7 (1963).

JOSEPH SCOVRONEK, Primary Examiner

E. A. KATZ, Assistant Examiner

U.S. Cl. X.R.

23—253